(12) United States Patent
Baumann

(10) Patent No.: US 7,128,107 B2
(45) Date of Patent: Oct. 31, 2006

(54) DEVICE FOR DISPENSING FLOWABLE MATERIAL COMPONENTS

(75) Inventor: Rudolf Baumann, Osterburken (DE)

(73) Assignee: AZO Holding GmbH, Osterburken (DE)

( * ) Notice: Subject to any disclaimer, the term of this patent is extended or adjusted under 35 U.S.C. 154(b) by 448 days.

(21) Appl. No.: 10/700,585

(22) Filed: Nov. 5, 2003

(65) Prior Publication Data

US 2004/0104251 A1   Jun. 3, 2004

(51) Int. Cl.
*B65B 1/04*   (2006.01)
(52) U.S. Cl. ............... 141/350; 141/260; 141/284; 141/349
(58) Field of Classification Search ............ 141/2, 141/18, 258–260, 264, 270, 284, 346, 347–352, 141/383; 222/410–413, 236, 333, 504, 181.1, 222/181.2, 185.1
See application file for complete search history.

(56) References Cited

U.S. PATENT DOCUMENTS 3,280,996 A   10/1966  Mckinney
6,420,665 B1   7/2002  Solignac
6,877,644 B1 *   4/2005  Link et al. ............... 222/413

FOREIGN PATENT DOCUMENTS

DE   41 19 354   12/1992
EP   0 287 708   10/1988

* cited by examiner

*Primary Examiner*—Timothy L. Maust
(74) *Attorney, Agent, or Firm*—Paul Vincent

(57) ABSTRACT

A device for dosed allocation of a flowable material component with at least one supply container for receiving the material component has an outlet and an associated removal device having an inlet via which the material component can be removed from the supply container in dosed charges by a screw and a controllable drive. The supply container and the removal device can be moved relative to each other to connect the outlet of the supply container to the inlet of the removal. The screw is disposed, without drive, in the region of the outlet of each supply container and comprises an outlet-side coupling means. The controllable drive is disposed in the region of the inlet of the removal device and comprises a drive shaft with a terminal coupling which can be connected to a coupling of the screw for secure mutual rotation therewith. A supply container and a removal means for such a device as well as container scales with a removal means of the above-mentioned type are also proposed.

24 Claims, 4 Drawing Sheets

DEVICE FOR DISPENSING FLOWABLE MATERIAL COMPONENTS

This application is related to DE 102 20 792.5 filed May 10, 2002 the entire disclosure of which is hereby incorporated by reference.

BACKGROUND OF THE INVENTION

The invention concerns a device for dosed dispensing of at least one flowable material component, with at least one supply container receiving the material component and having an outlet and with at least one removal means having an inlet, wherein the material component can be removed in batches from the supply container by means of a screw with controllable drive, and the supply container and the removal means can be moved relative to each other to connect the outlet of the supply container to the inlet of the removal means. The invention also concerns a supply container and a removal means for such a device and container scales comprising a removal means of the above-mentioned type.

Flowable material components, such as pasty materials, powder or granulated bulk material or the like, which are provided in supply containers, require dosed dispensing of the components to supply them to their intended use, in particular, when the dosed material components are to be supplied according to a predetermined recipe, to a mixer, a processing machine e.g. an extruder, an injection molding machine, a tablet-compressing machine, a packing machine, a conveyor or the like.

To detect the mass throughput of the discharged material components, prior art supply containers have a feed screw on their outlet side (EP 0 344 521). The feed screw is driven by a motor and disposed downstream of the outlet of the supply container which is formed e.g. as a silo, such that a desired quantity of the material component can be removed from the supply container. Dosing is effected volumetrically through the number of revolutions of the feed screw or gravimetrically, with the material component being transferred to a weighing container, and the feed screw is stopped as soon as the weighing container contains the desired amount of material. These systems are demanding and expensive due to the screw drive on each supply container, as well as inefficient, in particular for portable containers having a relatively small volume, e.g. for the allocation of chemicals, colorants, pharmaceutical substances etc.

DE 199 41 920 discloses conventional removal means comprising feed screws with a controllable drive which receive the material components to be dosed e.g. via a charging funnel. Dosing is also effected volumetrically through the number of revolutions of the screw or gravimetrically by transferring the material component into a weighing container via the screw. Disadvantageously, the material remaining in the feed screw after dosing of a material component must be disposed of and the use of such a removal means for dosed allocation of different material components produces undesired cross-contamination in the feed screw.

It is therefore the underlying purpose of the invention to propose a simple and inexpensive device which eliminates the above-mentioned disadvantages.

SUMMARY OF THE INVENTION

This object is achieved in accordance with the invention in a device with which the screw is disposed in the region of the outlet of the supply container without drive but rotatable and has a coupling means on the outlet side, and the region of the inlet of the removal means has a controllable drive whose drive shaft has a terminal coupling means which can be connected to the coupling means of the screw for secure mutual rotation therewith.

The inventive design permits exact dosing of the material component to be removed from the respective supply container by connecting the removal means to the outlet of the supply container and by connecting the coupling means of the drive shaft of the removal means to the coupling means of the screw, disposed without drive, in the region of the outlet of the supply container. The screw is then set into rotation via the drive shaft by the controlled drive of the removal means thereby transferring the material component from the outlet of the supply container through the inlet and into the removal means. As soon as the desired amount of material component has been removed from the supply container, the drive shaft is stopped, decoupled from the screw and the removal means is withdrawn from the outlet of the supply container. The dosed allocation can be conventionally provided volumetrically through control of the number of rotations of the drive shaft connected to the screw, gravimetrically by a weighing container connected downstream of the removal means, or in any other conventional fashion, e.g. optically, capacitively or the like. Since the screw substantially remains in the outlet of the supply container or can be slightly pulled out when the material is removed, the entire removed material can be supplied to its intended use without cross-contamination. The arrangement of the screw, without drive, in the region of the outlet of the supply container permits extremely inexpensive production thereof compared to supply containers having their own downstream, motor-driven feed screw such that the supply container can e.g. be constructed as a portable, one-way container. The supply container may of course also be a stationary storage container or a silo with an outlet disposed on the lower side of the container, wherein, in particular, several supply containers may be provided and the removal means may be displaceable between the outlets of the supply containers to remove the desired amounts of the various material components provided in the supply containers. The inventive device is suitable, in particular, for batch-like sequential supply of different material components provided in several supply containers, e.g. plastic granulated matter, additive colorants, pharmaceutical agents etc. which are to be fed to a mixer or a processing machine according to a predetermined recipe.

In a preferred embodiment, the screw has a closing piece at its outlet-side end which seals the inner sides of the outlet of the supply container and the drive shaft of the removal means can be axially displaced such that, after connecting the drive shaft to the screw, the closing piece can be moved away from the outlet of the supply container through axial displacement of the drive shaft and can also be reinserted. In this case, the drive shaft is slightly axially displaced from the outlet of the supply container after connecting its coupling means to the coupling means of the screw disposed in the supply container such that the connecting piece connected to the screw opens the outlet of the supply container. The screw is subsequently rotated via the drive shaft through the controlled drive of the removal means and the material component is transferred from the supply container into the removal means. As soon as the desired amount of material component has been removed from the supply container, the drive shaft is stopped and moved axially in the direction of the outlet of the supply container until the closing piece connected to the screw inwardly seals the outlet of the supply container, thereby closing it. The coupling means of the drive shaft and screw are subsequently released and the removal means is separated from the outlet of the supply container. Such an embodiment is particularly advantageous when material components are stored in the supply container which are sensitive to air and/or moisture, since neither the material removed nor the material remaining in the supply container comes in contact with the surroundings.

The drive shaft of the removal means may also have a closing piece at its inlet-side end which inwardly seals the inlet and opens the inlet of the removal means after axial displacement of the drive shaft. After connecting the coupling means of drive shaft and screw, the closing piece of the drive shaft suitably abuts on the closing piece of the screw to prevent collection of material removed from the supply container between the closing piece of the screw and the closing piece of the drive shaft. In a further advantageous embodiment, after coupling the drive shaft and screw, the closing piece on the inlet of the removal means is displaceable together with the screw and its closing piece when displacing the drive shaft into the container of the removal means, such that the screw projects into the inlet of the container of the removal means.

In a preferred embodiment, the outlet of the supply container has an outlet connecting piece which receives at least the outlet-side end of the screw and the inlet of the removal means can engage the outlet connecting piece. The removal means can be connected to the outlet of the supply container in a simple manner wherein centering means such as chamfers or the like may be provided for connecting the inlet of the removal means to the outlet connecting piece of the supply container.

The coupling means for connecting the drive shaft of the removal means to the screw of the supply container are each preferably disposed on the end face of the drive shaft or screw. The coupling means may be formed by any known mutually complementary means such as locking connections, polygonal profile, screw threads or the like which ensure connection between the drive shaft and the screw for detachable, secure mutual rotation therewith. The removal means is initially coupled in one direction of rotation, the removal means is then displaced, the dosed amount is transferred into the removal means, the screw is then returned into the outlet, and the drive shaft is decoupled, and returned into the container of the removal means in the opposite direction of rotation.

The removal means may have a drive controlled by a motor, in particular an electromotor or a manual drive for the drive shaft. A preferred embodiment provides that the drive shaft penetrates a housing of the removal means at its side facing away from the inlet and the motor or manual drive is disposed outside the housing.

As indicated above, the removal means preferably has associated container scales such that the amount of the material removed from the supply container can be gravimetrically detected.

The invention also concerns a supply container for receiving at least one flowable material component with an outlet via which the material component can be removed in batches from the supply container by means of a screw with controllable drive, in particular for a device of the above-mentioned type. In accordance with the invention, the screw does not have a drive, is disposed in the region of the outlet, and comprises an outlet-side coupling means for connecting to an external controllable drive.

At its outlet-side end, the screw preferably has a closing piece sealing the inner side of the outlet. The outlet preferably has a connecting piece which receives at least the outlet-side end of the screw. The coupling means is suitably disposed at the face of the screw.

The invention moreover concerns a removal means for dosed dispensing of at least one flowable material component with an inlet connecting to the outlet of a supply container of the above-mentioned type which is characterized by a controllable drive for the screw of the supply container, a drive shaft disposed in the region of the inlet, and a terminal coupling means which can be connected to the coupling means of the screw.

If the screw which is disposed, without drive, in the supply container, has a closing piece which seals the inner side of the outlet, the drive shaft can preferably be axially displaced and preferably has a closing piece closing the inner side of the inlet at its inlet-side end. The coupling means is conveniently disposed at the face of the drive shaft. The controlled drive may be a motor, in particular an electromotor, or be manual. The drive shaft preferably penetrates a housing of the removal means at its side facing away from the inlet with the drive being disposed outside the housing.

The advantages of the invention become particularly clear in a system for dosed dispensing of flowable material components disposed in several supply containers by means of a removal means with all supply containers or a group of supply containers being associated with a mobile removal A means having container scales. Moreover, the invention also concerns container scales having a removal means of the above-mentioned type.

The invention is described below by means of an embodiment with reference to the drawing.

DESCRIPTION OF THE PREFERRED EMBODIMENT

Figure 1:
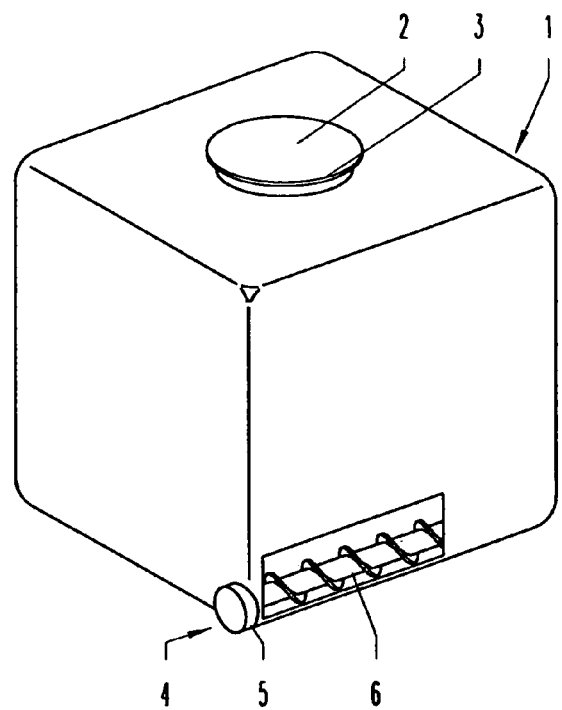
FIG. 1 shows a perspective view of a supply container, partially in section.

FIG. 1 shows an embodiment of a supply container 1 for receiving a flowable e.g. pasty or particulate material component. The supply container 1 is formed as a portable transport container in the present embodiment, wherein it may of course also be a stationary storage container, e.g. in the form of a silo or the like. The upper side of the supply container 1 has a filling opening 3 which can be closed by the lid 2. An outlet 4 for the supplied material component having a laterally formed outlet connecting piece 5 is provided in the region of the lower side facing away from the filing opening 3, preferably at the lowest location of the supply container 1. The region of the outlet 4 of the supply container 1 has a screw 6, without drive, whose arrangement and function is described in more detail below in connection with FIG. 3 ff. The supply container may have a funnel-shaped bottom and the screw 6 may be disposed at the lower end of the funnel.

Figure 2:
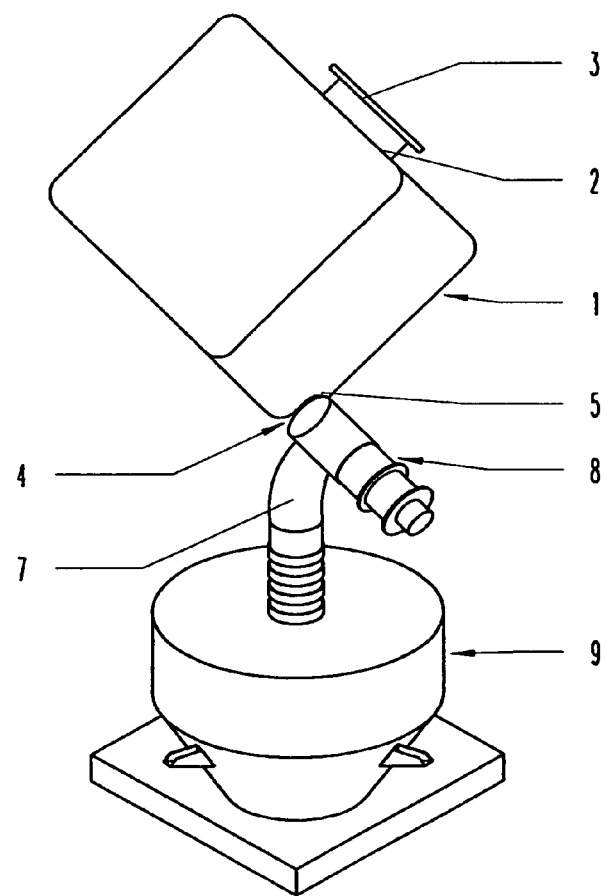
FIG. 2 shows a perspective view of the supply container of FIG. 1 connected to a removal means.

FIG. 2 shows the supply container 1 of FIG. 1 whose outlet 4 is connected to the upper-side inlet 7 of a removal means 8. The removal means 8 of the present embodiment are container scales 9 for gravimetric determination of the material component removed from the supply container 1.

Figure 3:
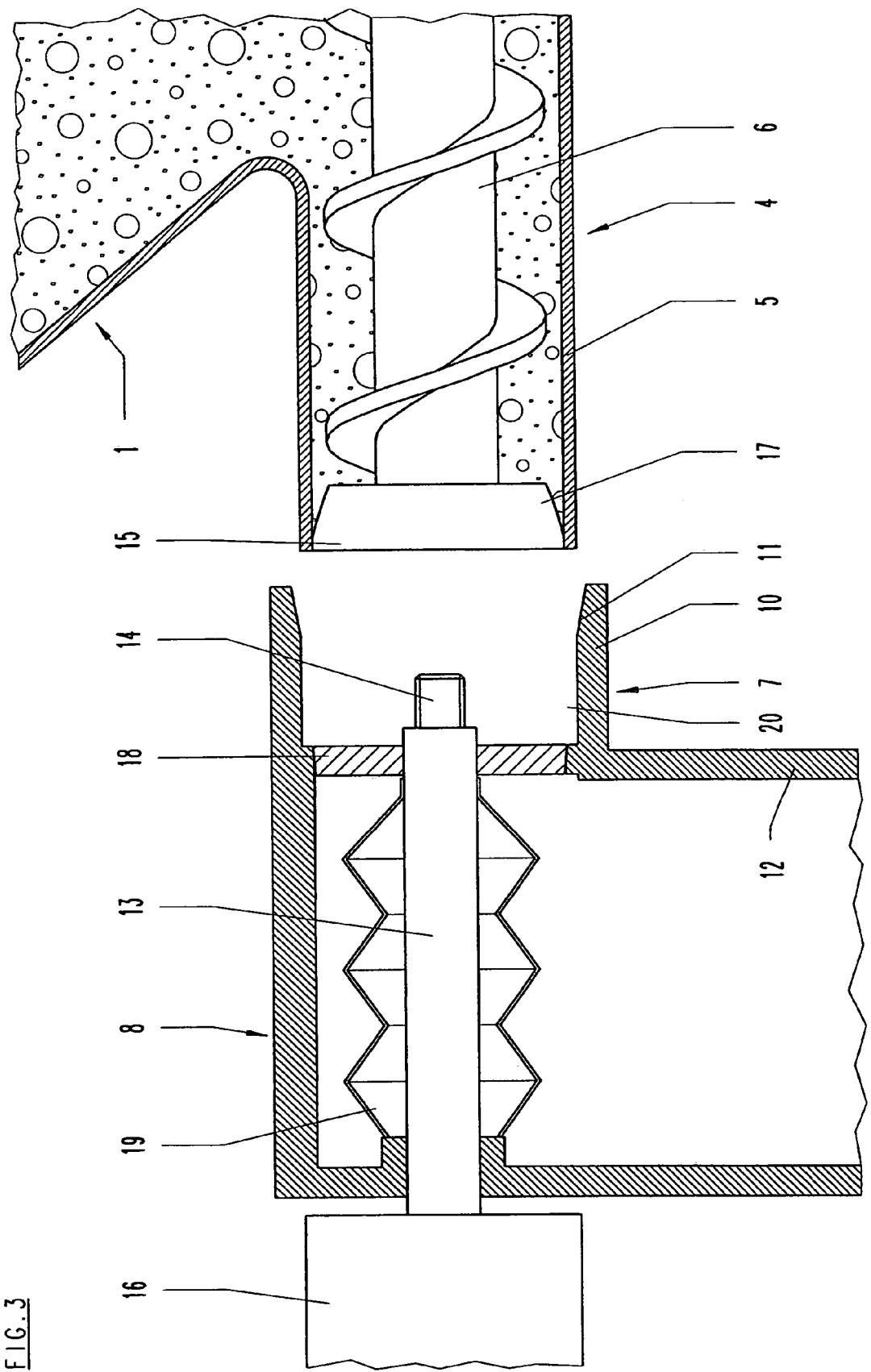
FIG. 3 shows a detailed cross-section in the region of the outlet of the supply container and the inlet of the removal means before connecting it to the supply container.

FIG. 3 shows that the inlet 7 of the removal means 8 has a tubular attachment 10 which can be disposed onto the outlet connecting piece 5 of the outlet 4 of the supply container 1 and has an inner-side chamfer 11 at its end for facilitating connection to the outlet connecting piece 5. The attachment 10 terminates radially in a housing 12 with closed upper side which serves to transfer the material removed from the supply container 1 (FIG. 5) to the weighing container 9 (FIG. 2). The removal means 8 has a drive shaft 13 disposed parallel to the inlet 7 whose free end can be connected to a face coupling means 15 of the screw for secure mutual rotation therewith. In the present embodiment, the coupling means 14 of the drive shaft 13 is formed by a thread attachment which engages in an inner thread of the coupling means 15 of the screw. Alternatively, any other coupling means may be provided which are suitable for transferring torques from the drive shaft 13 to the screw 6.

The end of the drive shaft 13 facing away from the coupling means 14 which penetrates the housing 12 of the removal means 8 has a controllable drive 16 on the outer side of the housing 12. The drive 16 may be manually actuated by turning a knob. Alternatively, or additionally, a motor drive 16, e.g. an electromotor may be provided, wherein, in this case, the drive shaft 13 is formed as driven shaft of an electromotor or may be connected thereto for secure mutual rotation therewith, with optional intermediate gearing.

FIG. 3 also shows that the outlet side end of the screw 6 has a closing piece 17 sealing the inner side of the outlet 4 of the supply container 1 which is rigidly connected to the screw 6 and e.g. may be formed in one piece therewith. The closing piece 17 seals the outlet 5 and holds the screw 6 in the rest position shown in FIG. 3. Correspondingly, the drive shaft 13 of the removal means 8 has a closing piece 18 at its free end which closes the inlet 7 in the rest position (FIG. 3) by sealingly abutting the inner side of the attachment 9.

Figure 5:
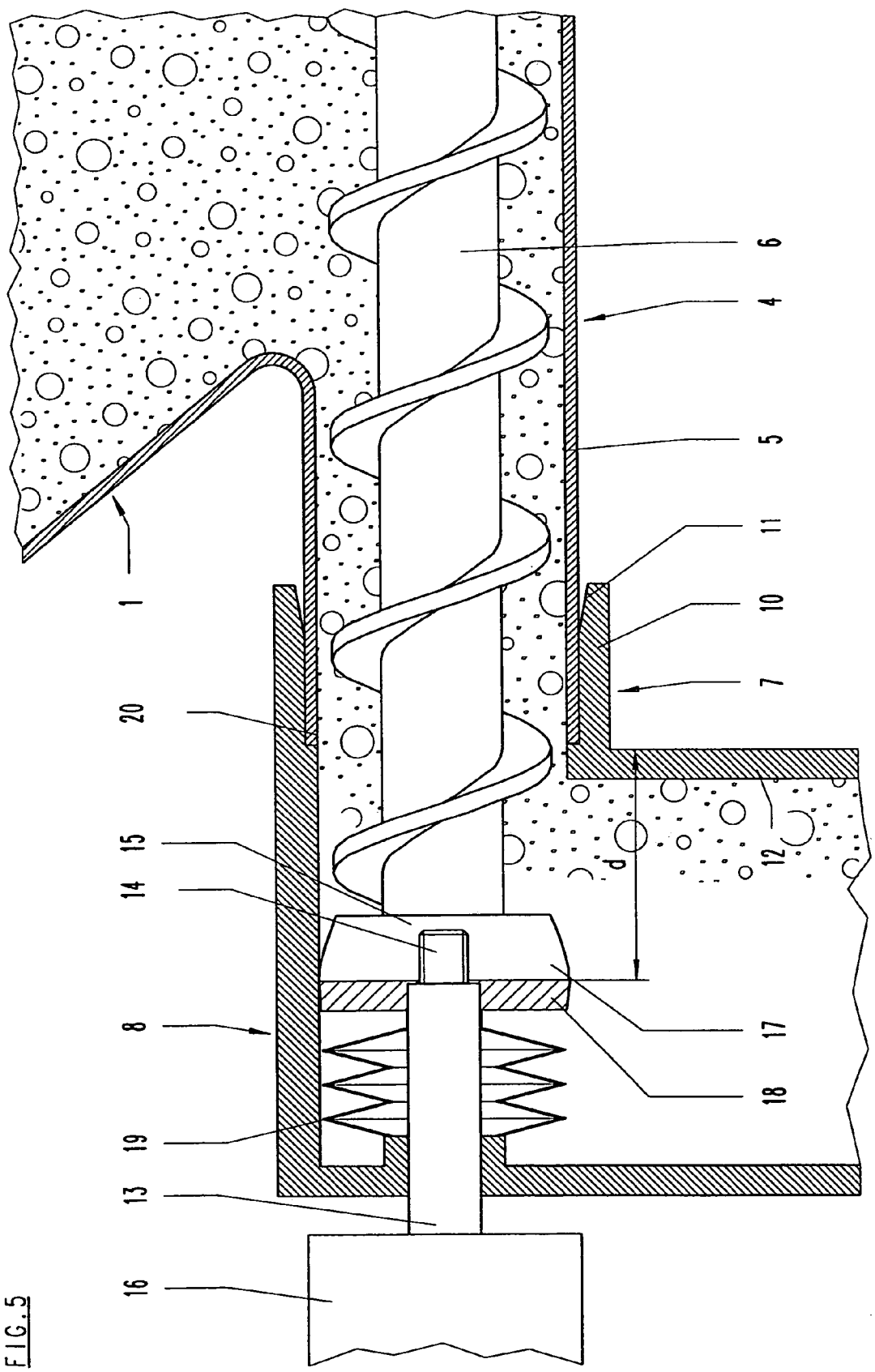
FIG. 5 shows a cross-section of FIGS. 3 and 4 during material removal.

The drive shaft 13 can be axially displaced through a separation d between its rest position shown in FIG. 3 and an operating position shown in FIG. 5. The screw 6 can be equally displaced in the outlet connecting piece 4 of the container. To protect the drive shaft 13 from contacting the material removed from the supply container 1, a bellows 19 is provided which surrounds the shaft 13 and is fixed in the region of the free end of the drive shaft 13 or the closing piece 18 or in the region of the housing 12 penetrated by the shaft 13.

The function of the device is explained in more detail below.

Figure 4:
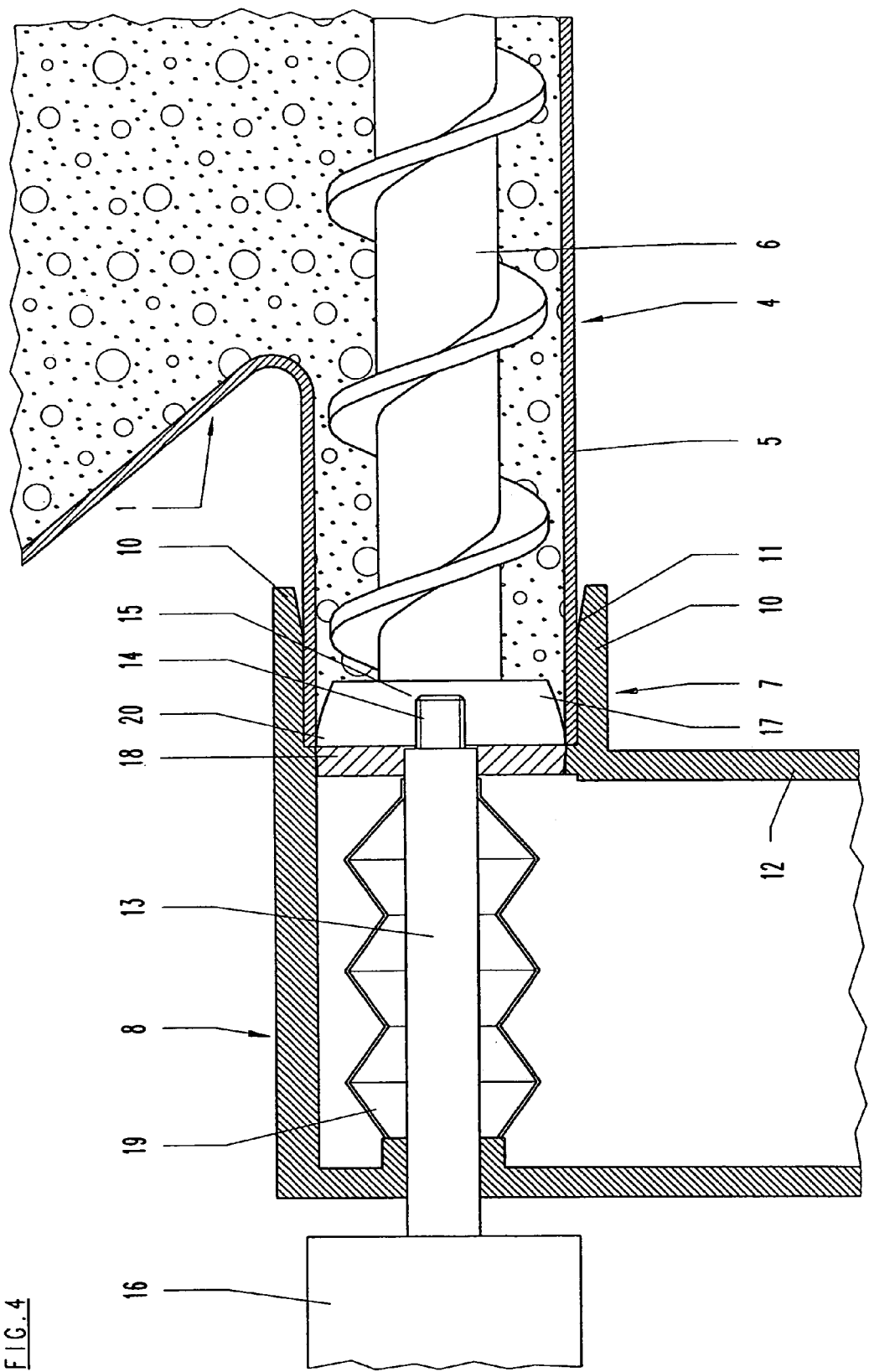
FIG. 4 shows a cross-section of FIG. 3 after connecting the removal means to the supply container and connecting the coupling means.

For dosed allocation of the material component provided in the supply container 1, the inlet-side attachment 10 of the removal means 8 is engaged with the outlet connecting piece 5 of the supply container 1, wherein the connecting piece 5 abuts with its face on an inner side cross-sectional narrowing 20 of the attachment 10 which serves as abutment (FIG. 4). If the supply container is a portable supply container 1 as shown in FIGS. 1 and 2, the inlet of the removal means 8 can be manually connected to the outlet 4 of the supply container 1. If the supply container has a large volume, e.g. a silo, the removal means may be displaceable relative to the supply container 1 together with the container scales 9 e.g. between the relative positions shown in FIGS. 1 and 2, wherein, in particular, several supply containers may be provided and the removal means 8 may also be displaceable between the outlets 4 of the supply containers to remove the different material components stored in the supply containers in the desired amounts and transfer them e.g. to a mixer (not shown).

FIG. 4 shows that the coupling means 14 of the drive shaft 13 is connected to the coupling means 15 of the screw 6 after connecting the removal means 8 to the supply container 1, wherein the closing piece 18 of the drive shaft 13 abuts the closing piece 17 of the screw 6. The drive shaft 13 is subsequently axially displaced together with the screw 6 through a separation d such that the closing piece 17 which is rigidly connected to the screw 6 exposes the outlet 4 of the supply container 1 (FIG. 5) and the screw projects into the housing of the removal means. The drive shaft 13 is then rotated by the controllable drive 15, wherein the material component is transferred from the supply container 1 into the removal means 8 in response to rotation of the screw. The amount of removed material is e.g. gravimetrically determined e.g. by means of the container scales 9 connected downstream of the removal means (FIG. 2). As soon as the desired amount of material has been removed from the supply container, the drive shaft 13 is stopped by the controllable drive 15 and axially displaced through the distance d towards the inlet 7 such that the closing pieces 17, 18 of the screw 6 and the drive shaft 13 close the outlet 4 of the supply container 1 and the inlet 7 of the removal means 8 (FIG. 4). The coupling means 14, 15 are mutually released, e.g. separated from the supply container 1 through opposite rotation of the drive shaft and the removal means 8.

The inventive device is suitable, in particular, for dosed allocation of different material components provided in several supply containers 1 in a predetermined mixing ratio, wherein the supply containers 1 have a simple and inexpensive construction and cross-contaminations of the removal means 8 are reliably prevented.

I claim:

1. A device for dosed allocation of at least one flowable material component, the device comprising:
at least one supply container receiving the material component, the supply container having an outlet and a screw disposed, without drive but rotatable, in a region of said outlet of said supply container, said screw having an outlet-side screw coupling means; at least one removal means with a container having an inlet, said removal means having a controllable drive disposed in a region of said inlet, said controllable drive having a drive shaft with a shaft coupling means which can be connected to said screw coupling means for secure mutual rotation therewith to remove the material component from the supply container in dosed charges; and means for moving said supply container and said removal means relative to each other, wherein an outlet-side end of said screw has a screw closing piece sealing an inner side of said outlet of said supply container, and said drive shaft of said removal means can be axially displaced such that said screw closing piece can be displaced from said outlet of said supply container, after connecting said drive shaft to said screw, through axial displacement of said drive shaft and can also be reinserted therein.

2. The device of claim 1, wherein said drive shaft has a shaft closing piece at its inlet-side end to seal an inner side of said inlet of said removal means.

3. The device of claim 2, wherein said shaft closing piece, said screw, and said screw closing piece can be displaced at said inlet of said removal means after coupling said drive shaft and said screw when said drive shaft is displaced in said container of said removal means, wherein said screw moves into said inlet of said container of said removal means.

4. The device of claim 1, wherein said outlet of said supply container has an outlet connecting piece which receives at least an outlet-side end of said screw, wherein said inlet of said removal means can sealingly engage with said outlet connecting piece.

5. The device of claim 1, wherein said screw and said shaft coupling means, for connecting said drive shaft of said removal means to said screw of said supply container, are each disposed at a respective face of said drive shaft and said screw.

6. The device of claim 1, wherein said shaft and said screw coupling means comprise an outer thread on said drive shaft and an inner thread on said screw.

7. The device of claim 1, further comprising a motor for driving said drive shaft.

8. The device of claim 7, wherein said motor is an electromotor.

9. The device of claim 1, further comprising means for manually driving said drive shaft.

10. The device of claim 1, wherein said removal means comprises a housing through which said drive shaft penetrates at a housing side facing away from said inlet, wherein said drive is disposed outside said housing.

11. The device of claim 1, wherein said removal means has an associated container scale.

12. A supply container for receiving at least one flowable material component allocated by the device of claim 1, the supply container comprising:
   means defining a component outlet via which the material component can be removed from said supply container; and a screw disposed, without drive, in a region of said outlet, said screw having an outlet-side screw coupling means for connecting to an external, controllable drive for removal of the material from the supply container in dosed charges.

13. The supply container of claim 12, wherein said screw has a closing piece at an outlet-side end which seals an inner side of said outlet.

14. The supply container of claim 12, wherein said outlet has an outlet connecting piece which receives at least an outlet-side end of said screw.

15. The supply container of claim 12, wherein said coupling means is disposed at an end face of said screw.

16. A removal means for dosed allocation of at least one flowable material disposed in the supply container of claim 12, the removal means comprising:
   means defining an inlet which can be connected to the outlet of the supply container;
   a drive shaft disposed in a region of said inlet;
   a terminal drive coupling means cooperating with said drive shaft for connection to said screw coupling means; and
   a controllable drive cooperating with said drive shaft.

17. The removal means of claim 16, wherein said drive shaft can be axially displaced.

18. The removal means of claim 16, wherein said drive shaft has a closing piece at an inlet-side end for sealing an inner side of said inlet.

19. The removal means of claim 16, wherein said drive coupling means is disposed on a face of said drive shaft.

20. The removal means of claim 16, wherein said controllable drive comprises a motor.

21. The removal means of claim 16, wherein said motor is an electromotor.

22. The removal means of claim 16, wherein said controllable drive comprises manual drive means for said drive shaft.

23. The removal means of claim 16, further comprising a housing through which said drive shaft penetrates said removal means on a side facing away from said inlet, wherein said drive is disposed outside said housing.

24. Container scales cooperating with the removal means of claim 16.

* * * * *